United States Patent [19]

Gillner

[11] Patent Number: 5,451,280

[45] Date of Patent: Sep. 19, 1995

[54] PROCESS FOR THE PRODUCTION OF A CURVED, LAMINATED GLAZING, IN PARTICULAR A CAR GLAZING

[75] Inventor: Manfred Gillner, Aachen, Germany

[73] Assignee: Saint-Gobain Vitrage International, Paris La Defense, France

[21] Appl. No.: 245,036

[22] Filed: May 17, 1994

[30] Foreign Application Priority Data

May 18, 1993 [DE] Germany .............. 43 16 575.3

[51] Int. Cl.$^6$ ............... B32B 17/10; C03B 40/00; C03C 8/18; C03C 17/34

[52] U.S. Cl. ................... 156/106; 65/60.2; 65/106; 65/60.53; 65/24; 501/19; 252/514; 106/1.18; 427/108; 427/165; 427/269; 427/380; 156/100

[58] Field of Search ............... 156/99, 100, 102, 104, 156/106, 100; 65/60.1, 60.2, 106, 107, 60.53, 24; 501/19; 242/514; 106/1.18; 427/108, 165, 269, 380

[56] References Cited

U.S. PATENT DOCUMENTS

| | | | |
|---|---|---|---|
| 2,584,859 | 2/1952 | Gaiser | 156/106 X |
| 2,730,598 | 1/1956 | Lytle | 501/19 X |
| 3,012,924 | 12/1961 | Browne | 156/106 X |
| 4,552,691 | 11/1985 | Shoji et al. | 106/1.18 X |
| 4,654,067 | 3/1987 | Ramus et al. | 65/107 X |
| 4,668,270 | 5/1987 | Ramus | 65/107 X |
| 4,744,844 | 5/1988 | Hurst | 156/106 X |
| 4,828,596 | 5/1989 | Reinherz | 65/107 X |
| 4,959,090 | 9/1990 | Reinherz | 501/19 X |
| 5,011,627 | 4/1991 | Lutz et al. | 252/514 X |
| 5,302,557 | 4/1994 | Carroll et al. | 501/19 |
| 5,324,373 | 6/1994 | Gillner et al. | 156/99 |

*Primary Examiner*—Michael W. Ball
*Assistant Examiner*—Francis J. Lorin
*Attorney, Agent, or Firm*—Oblon, Spivak, McClelland, Maier & Neustadt

[57] ABSTRACT

A curved, laminated car glazing having a decorative enamel coating formed as a frame along the edge of a laminated glazing, on a surface adjacent to the intermediate, thermoplastic layer of one of the individual glass sheets is prepared by printing an enamel as the decorative coating on a glass sheet, which is then dried, printing an enamel containing metallic silver as a narrow strip on the decorative coating, firing or baking the coated glass sheet, superimposing the baked glass sheet with a mating glass sheet with the printed coating on the inside, and with the result that the bent sheets do not stick together because of the presence of the silver-containing strip, and completing the lamination of the curved glass sheets.

9 Claims, 1 Drawing Sheet

PROCESS FOR THE PRODUCTION OF A CURVED, LAMINATED GLAZING, IN PARTICULAR A CAR GLAZING

BACKGROUND OF THE INVENTION

Field of the Invention

The present invention relates to a process for the production of a glazing of curved, laminated glass, particularly a car glazing, formed from at least two individual glass sheets and at least one intermediate, thermoplastic sheet which connects the glass sheets together in which a decorative coating of a baking ink, such as an enamel, is applied by printing to one of the individual glass sheets, onto the surface which is to subsequently come into contact with the intermediate sheet and in the marginal zone.

DESCRIPTION OF THE BACKGROUND

The application of a decorative coating of a baking or firing ink such as an enamel, in the form of a frame, which is opaque to light and UV rays, in the marginal zone of glazings, is necessary when the glazings are fixed by bonding in the window frame of the body of a vehicle. In this instance the adhesive bead is protected by the decorative coating against UV rays, which can have the effect of embrittling the adhesive. Further, the adhesive bead is then no longer visible through the glazing. In the case of laminated glass glazings, the decorative coating is also generally applied on the outer surface of the glazing turned towards the vehicle interior. However, in certain cases, e.g., when electrical conductors are installed in the intermediate coating of the laminated glass glazing, it is extremely advantageous to be able to apply the decorative coating on the side of the outer individual glass sheet facing the intermediate, thermoplastic sheet, so that the electrical conductors and/or collecting bands to which they are attached remain invisible from the outside. It is in such cases that the process of the invention is relevant.

When glazings of curved, laminated glass formed from two glass sheets and an intermediate, thermoplastic sheet have to be provided internally, i.e., on a surface adjacent the intermediate, thermoplastic sheet, with a decorative coating as mentioned, it is not generally possible, during the production of such glazings, to carry out the baking or firing of the baking or firing ink which constitutes the decorative coating and which is deposited on one of the glass sheets, during the curving operation when the two glass sheets are curved together as a pair. Indeed, conventional baking inks contain organic constituents which, at the baking temperatures, form gaseous reaction products which cannot escape from the small gap between the two glass sheets. There is also an increased risk, during the melting of the baking ink, of the two glass sheets sticking to one another.

DE-A1-41 32 652 shows the drying of the coating which is applied by printing only at a temperature at which the liquid vehicle present in the printing ink, such as screen printing or serigraphic oil, is vaporized. It also discloses conducting the baking operation when the glass plates, as pairs, of superimposed glass sheets, are curved without bonding of the glass sheets. However, this procedure involves the use of special baking inks which, during bending do not bring about the adhesion of the glass sheets, but unfortunately the specificity of these inks leads to other problems.

The pairwise bending of the glass sheets with simultaneous baking of the baking ink and the use of conventional baking inks of the enamel type is also described in EP-B1-13 970, but only for the case where the baking ink is applied in a partial, central area of the glazing. In the case of a pairwise bending, the two glass sheets separate slightly because of the temperatures of their outer surfaces, which are above the temperatures of their inner surfaces, which makes it possible for the reaction gases to escape and also prevents the two glass sheets from adhering to each other. However, if the baking ink extends over more extensive surface areas or along the entire edge, the process cannot be used.

It is obviously possible to carry out the baking of the baking ink of the enamel type prior to bending, as described in DE-A1-39 20 573. This process more particularly employs a special cooling tunnel for the controlled cooling of glazings during the baking of the printed coating. In this process, the baking of the enamel coating before the bending takes place in a roller furnace upstream of the cooling tunnel, in which the flat glass sheets are heated to baking temperatures of 550° to 600° C. However, this process does not prevent the adhesion of the glass sheets to each other in numerous cases, when any one of many commercial baking inks of the enamel type is used, which inks adhere, on softening, to the glass sheets and possibly to other elements (such as transformation dies) which come into contact with the inks at the bending temperatures.

According to another process (DE-42 01 275), the baking operation takes place in the following way. A glass sheet has a coating of baking ink of the enamel type applied by printing thereto. The glass sheet having the applied coating facing upwards is applied on a mating glass sheet. The pair of glass sheets, in this arrangement, is subjected to bending on an annular curving mold, with simultaneous baking of the coating. Following the cooling of the precurved glass sheets, they are interchanged, in such a way that the baked ink coating is on an inside face and the pair of glass sheets is, in this arrangement, curved to its final shape during a second curving process. However, once again there are problems of the glass sheets sticking together when certain conventional inks are used and this occurs for the reasons given in the previous paragraph.

Although it is standard practice in the two previously mentioned processes to cover the baked ink coating, prior to the bending process, with a heat-resistant separating agent, e.g., talc or sodium sulfate, it is still not possible during pairwise bending with the ink coating on the inside, to prevent the two individual glass sheets from adhering to each other at certain points. Generally this adhesion leads to the pair of glass sheets in question being rejected as waste. A need continues to exist for an improved method of forming a laminated glazing having a decorative coating of printing ink applied on the inside.

SUMMARY OF THE INVENTION

Accordingly, one object of the present invention is to provide a process for the production of a curved, laminated glazing having a decorative coating in the form of a frame of a baking ink of the conventional baking type such as an enamel, the decorative coating being located on the inside of the laminated glazing, wherein it is reliably ensured that the glass sheets do not stick to each other during the bending of said sheets, so that the efficiency of the bending process is improved.

Briefly, these and other objects of the present invention as hereinafter will become more readily apparent can be attained by the present process for the production of a glazing of curved, laminated glass, particularly a car glazing, formed from at least two individual glass sheets and at least one interposed thermoplastic sheet which connects the two glass sheets together, comprising:

applying a decorative coating of a baking ink by printing onto the peripheral marginal surface of a glass sheet which is to come into contact with said interposed thermoplastic sheet and then drying or hardening the applied coating;

applying a baking ink containing metallic silver along the surface of the dried decorative coating, which, during subsequent bending, prevents any contact between the decorative coating and a glass sheet in contact with the coated glass sheet;

baking the glass sheet bearing the decorative coating at a higher temperature than the temperature of the drying or hardening step;

superimposing the glass sheets with the baked decorative coating towards the inside;

bending the combined glass sheets to the desired curved shape over a block; and joining the glass sheets in pairwise mating fashion through the intermediate thermoplastic sheet positioned between the two glass sheets under heat and pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
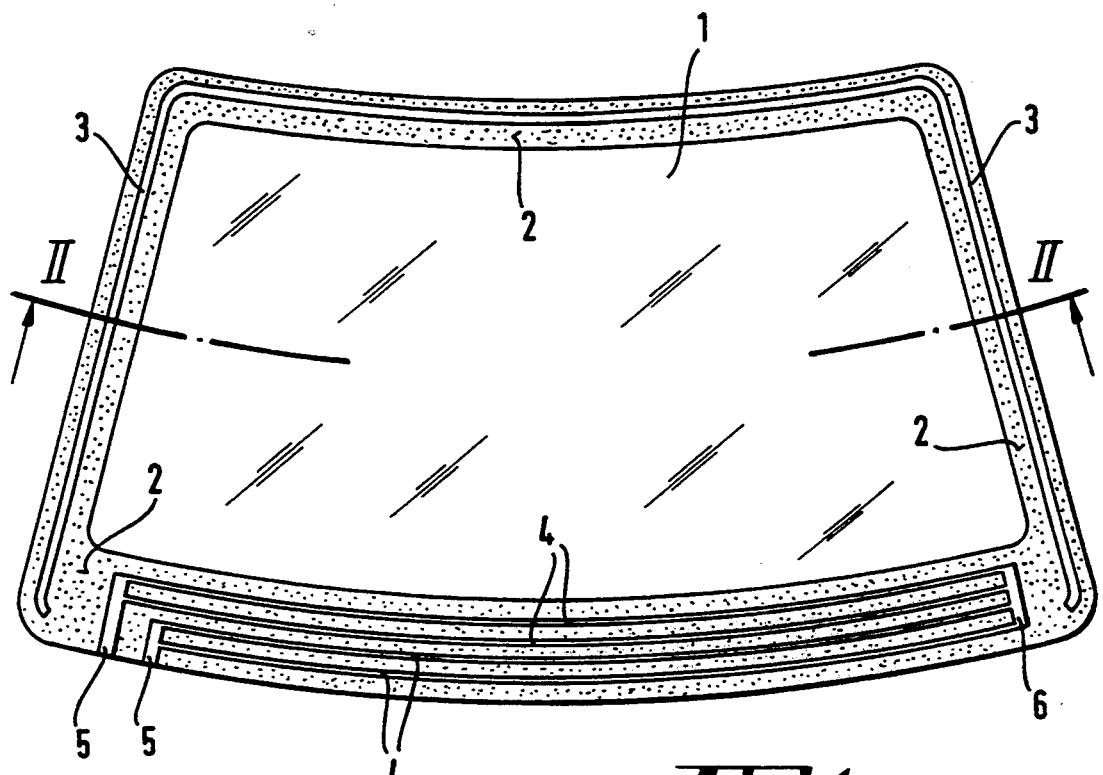
FIG. 1 is a printed glass sheet of the present invention which is intended for use as a laminated glass windscreen which has a heated area on its lower edge.
Figure 2:
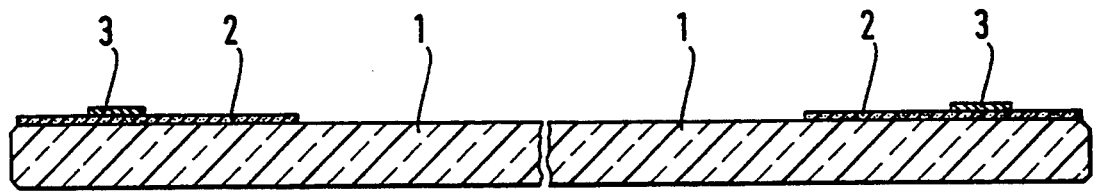
FIG. 2 is a larger-scale sectional view along line II—II in FIG. 1.

The discovery of the present invention is that, following the application by printing of the decorative coating to one of the individual glass sheets and following the subsequent drying process, a baking ink such as an enamel containing metallic silver is applied by printing along the decorative coating, which applied baking ink, at the time of the bending operation, prevents any contact between the decorative coating and the other glass sheet and therefore prevents the adhesion which normally occurs with the coating, between a second sheet and the glass sheet on which the decorative coating has been applied.

Although it is known to apply by printing to a decorative coating formed from a black or grey baking ink, an electrical conductor formed from a baking ink containing metallic silver and then baking the two coatings together, it was not expected that this measure would also be able, during the bending of the glass sheets having a decorative coating on the inside, to prevent any mutual adhesion between the glass sheets when, according to the invention, such a coating containing the conductive silver was applied along the decorative coating.

In the invention, it is not necessary for the decorative coating to be covered by overprinting over its entire surface in an uninterrupted manner by the coating which contains the conductive silver. It is in fact sufficient and advisable for cost reasons, to only print the decorative coating with a narrow band of about 2 to 5 mm wide over the quasi-entire length of hte decorative frame. Optionally, the entire length can be coated. The printed strip or band containing the conductive silver can have interruptions of varying size without compromising the success of the process. The baking ink containing the metallic silver can notably be printed on the decorative coating in the form of non-continuous strip segments, distributed in more or less uniform manner along the decorative strip, or the coating of conductive silver along the decorative strip can be interrupted at one or more points of the glazing, the strip or the segments covering at least most of the length of the decorative frame and possibly its entire perimeter. It is also possible to print on the decorative coating, in place of a continuous strip or segments of baking ink containing the conductive silver, other geometrical, or nongeometrical, discontinuous figures close to one another of the conductive silver-containing ink, such as consecutive points, the figures covering the quasi-entire length of the decorative frame.

The baking ink containing the metallic silver is preferably applied to the decorative coating at a short distance from the edge of the glass and parallel thereto. In preferred manner, the baking ink used for forming the coating which prevents the adhesion of the sheets, above the decorative coating, contains metallic silver in a quantity of 60 to 90, preferably 70 to 80% by weight.

The particular advantage of the process of the invention is that it is possible to use conventional, proven baking inks for the decorative coatings and for the electrically-conducting conducting coatings. Thus, a high reliability can be expected, because it is possible to use standard parameters of processing for curved, laminated glazings having a decorative coating.

For a decorative coating applied, for example, by screen printing, a UV-hardening baking ink with baking temperatures of 550° to 650° C. has proved satisfactory, said ink containing, in parts by weight and as the main constituents, approximately 3.3 parts of a glass frit, 1 part of a coloring agent and 0.8 part of a screen printing oil. The glass frit is a lead borosilicate glass and the coloring agents are mainly copper-chromium-spinel.

For the conductive silver baking ink, screen printing pastes hardening in the heat at baking temperatures of 550° to 650° C. have proved satisfactory. The baking inks contain a glass frit also in the form of a lead borosilicate glass, screen printing oil and 60 to 90% by weight metallic silver.

The process of the invention is of particular applicability when a printing of a baking ink containing metallic silver is intended for location on the decorative coating in order to, e.g., form a network of electrical conductors. The baking ink strip, containing the metallic silver, makes it possible to prevent the sticking together of the glass sheets. It is printed at the same time as the baking ink for forming the network of electrical conductors, over the residual length of the decorative strip, as in the example described hereinafter, and all the baking ink containing the metallic silver prevents contact of the decorative coating with a glass sheet other than the one on which the coating is deposited, in accordance with the principle of the present invention.

Having generally described this invention, a further understanding can be obtained by reference to certain specific examples which are provided herein for purposes of illustration only and are not intended to be limiting unless otherwise specified.

Glass sheet 1 is an individual glass sheet which subsequently forms, in the finished, laminated glass glazing, the outer glass sheet, which is the sheet which faces towards the outside. To the outer glass sheet 1 are applied by printing and then baking, on the side facing the inside, i.e., towards the intermediate, thermoplastic sheet, the various coatings such as the decorative coating in the form of a frame 2, the narrow, conductive silver strip 3, as well as the heating conductor 4, the collecting bands 5 and the connecting conductor 6, which are also of conductive silver enamel.

The decorative frame 2 is applied by printing, in known manner using screen printing, to the flat glass sheet 1 during a flat printing operation. The baking ink is, e.g., constituted of a grey, screen printing ink which hardens under UV at a baking temperature of 580° to 620° C. Immediately following the printing operation, the decorative coating 2 is hardened by irradiation with UV light, so that it can be subjected to a second printing operation. During the second screen printing operation, printing takes place in the lower marginal area of the glass sheet 1, of the heating conductors 4, the collecting bands 5 and connecting conductor 6 using a conventional conductive silver baking ink. This heating area is located in the inoperative zone of the windscreen wipers and serves, in case of need, to free frozen wipers and/or to melt snow accumulations in this area.

During the same stage of the process as that during which the heating zone formed from the conductors 4, 5 and 6 is printed, a narrow, continuous strip 3 of the same conductive silver baking ink is printed along the periphery of the glass sheet, on the decorative coating 2 and at a short distance from the edge of the glass. The strip 3, e.g., has a width of 3 to 4 mm and its distance from the edge of the glass is, e.g., 2 to 5 mm. Like the conductors 4, 5 and 6, the strip 3 has a thickness of approximately 20 $\mu$m.

Following the printing of the conductive silver baking ink, the latter is hardened by infrared rays, so that the printed glass sheets can be manipulated without the printed coatings being damaged. The printed glass sheets, whose printed faces are turned in the upwards direction, then undergo a heat treatment process at approximately 600° C., during which the screen printing oil serving as the carrying liquid during the printing process vaporizes and the glass frit of the baking ink of the decorative frame melts and forms an imperforate enamel coating. During this baking operation, the strip 3 and the conductors 4, 5, 6 are also baked and subsequently remain as relief strips on the decorative coating 2.

Following the baking operation, the glass sheet 1 is superimposed on the second, individual glass sheet in such a way that the printed side of the glass sheet 1 is adjacent to the second, individual glass sheet. In this arrangement, the pair of glass sheets undergoes a bending operation, i.e., it is heated to a temperature of at least 620° C. and is then bent from a block in accordance with a known bending process.

Following curving and cooling at ambient temperature, the two bent glass sheets are separated from each other. They are then again superimposed with the interposition of a film of a thermoplastic polymer such as polyvinyl butryal (PVB) and are joined to each other in the conventional manner, under heat and pressure, in order to form the laminated glass glazing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the production of a glazing of curved, laminated glass comprising two individual glass sheets and one interposed thermoplastic sheet which connects the two glass sheets together, comprising:
   applying a decorative coating of a baking ink by printing onto the peripheral marginal surface of a first glass sheet, on the side of said glass sheet which is to come into contact with said interposed thermoplastic sheet, and then drying or hardening the applied coating;
   applying a baking ink containing metallic silver along the surface of the dried decorative coating and substantially over its entire length, which, during subsequent bending, prevents any contact between the decorative coating and a second glass sheet which is later placed in contact with the coated first glass sheet;
   baking the first glass sheet bearing the decorative coating at a higher temperature than the temperature of the drying or hardening step;
   superimposing the glass sheets with the baked decorative coating between the glass sheets;
   bending the combined glass sheets to the desired curved shape over a block;
   separating the bent combined glass sheets; and
   laminating the glass sheets in pairwise mating fashion through the intermediate thermoplastic sheet positioned between the two glass sheets under heat and pressure.

2. The process according to claim 1, wherein the baking ink containing the metallic silver is applied by printing to the decorative coating, in the form of a narrow, 2 to 5 mm wide strip.

3. The process according to claims 1 or 2, wherein the baking ink containing the metallic silver is applied by printing to the decorative coating, in the form of an interrupted strip or non-continuous strip segments.

4. The process according to claim 1, wherein the baking ink containing the metallic silver is applied by printing to the decorative coating, in the form of geometrical or non-geometrical, close to one another, discontinuous figures.

5. The process according to claims 1 or 2, wherein the baking ink containing the metallic silver is applied by printing to the decorative coating parallel to the edge of the first glass sheet.

6. The process according to claims 1 or 2, wherein the baking ink containing the metallic silver is applied by printing to the decorative coating at a short distance from the edge of the first glass sheet.

7. The process according to claim 1, wherein the baking ink contains the metallic silver in an amount of 60 to 90 wt. %.

8. The process according to claim 7, wherein the amount of metallic silver in the baking ink ranges from 70 to 80 wt. %.

9. The process of claim 1, wherein the silver baking ink comprises a lead borosilicate glass frit, a screen printing oil and 60 to 90% by wt. metallic silver.

* * * * *